US012684329B2

(12) United States Patent
Kuravangi-Thammaiah et al.

(10) Patent No.: US 12,684,329 B2
(45) Date of Patent: Jul. 14, 2026

(54) SYSTEMS AND METHODS FOR OPTIMIZED PROPAGATION OF DATA CHANGE NOTIFICATIONS

(71) Applicant: Verizon Patent and Licensing Inc., Basking Ridge, NJ (US)

(72) Inventors: Shanthala Kuravangi-Thammaiah, Keller, TX (US); Violeta Cakulev, Milburn, NJ (US); Lalit R. Kotecha, San Ramon, CA (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 721 days.

(21) Appl. No.: 18/175,709

(22) Filed: Feb. 28, 2023

(65) Prior Publication Data

US 2024/0292204 A1 Aug. 29, 2024

(51) Int. Cl.
H04W 8/18 (2009.01)
H04W 8/22 (2009.01)

(52) U.S. Cl.
CPC .............. H04W 8/18 (2013.01); H04W 8/22 (2013.01)

(58) Field of Classification Search
CPC .................................. H04W 8/18; H04W 8/22
See application file for complete search history.

(56) References Cited

U.S. PATENT DOCUMENTS

2022/0150811 A1* 5/2022 Kim ...................... H04W 76/10

FOREIGN PATENT DOCUMENTS

WO WO-2021160547 A1 * 8/2021 .............. H04W 8/20
WO WO-2022106067 A1 * 5/2022 ........... H04L 41/024
WO WO-2024070837 A1 * 4/2024 ........... H04W 48/18

* cited by examiner

*Primary Examiner* — Marisol Figueroa

(57) ABSTRACT

In some implementations, a unified data repository (UDR) device may receive, from a unified data management (UDM) device or a policy control function (PCF) device, a subscription request to subscribe to receive a data change notification from the UDR device. The subscription request may include a monitoring indication and a report indication. The monitoring indication may identify a monitored data set associated with a user equipment (UE). The report indication may identify an attribute data set associated with the UE and indicate a request to receive a report associated with the attribute data set. The UDR may transmit, to at least one of the UDM device or the PCF device, an indication of a subscription to receive the data change notification based on the subscription request and the report based on the report indication.

20 Claims, 8 Drawing Sheets

100

Second Network Device 110

Subscription request that includes the report indication 155

Subscription request response and the report 165

UDR Device 115

Generate a report 160

400

Bus
410

Processor
420

Memory
430

Input
Component
440

Output
Component
450

Communication
Component
460

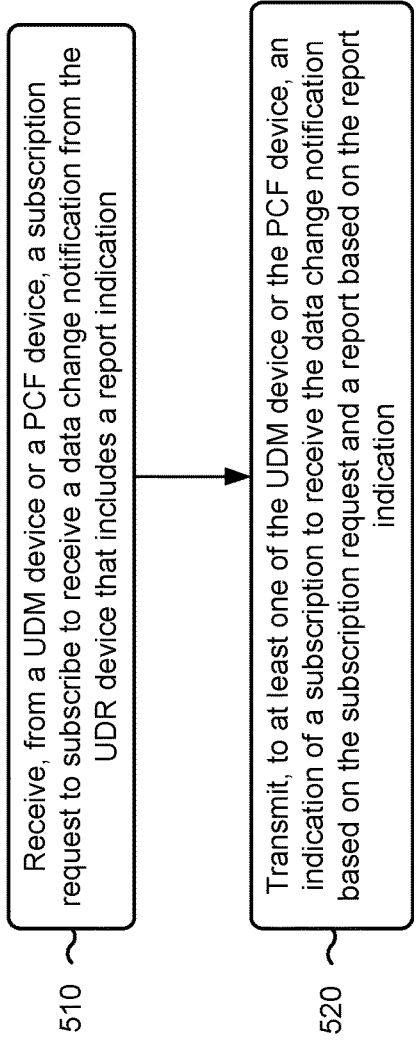

Receive, from a UDM device or a PCF device, a subscription request to subscribe to receive a data change notification from the UDR device that includes a report indication

510

Transmit, to at least one of the UDM device or the PCF device, an indication of a subscription to receive the data change notification based on the subscription request and a report based on the report indication

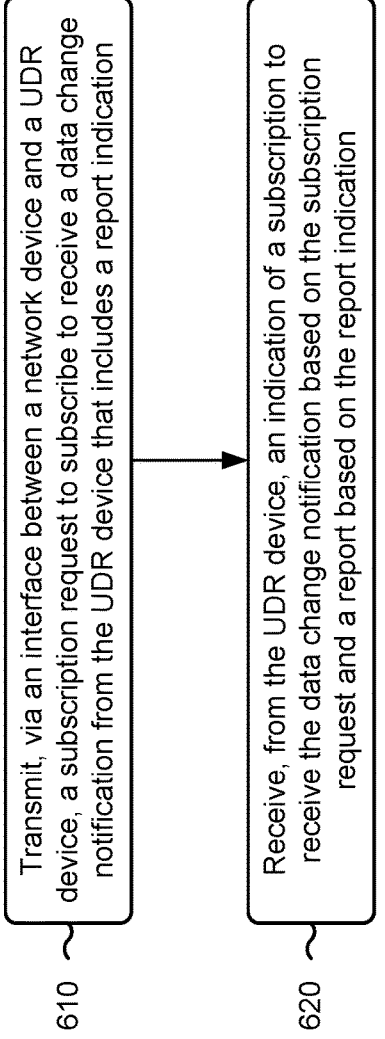

610 — Transmit, via an interface between a network device and a UDR device, a subscription request to subscribe to receive a data change notification from the UDR device that includes a report indication 620 — Receive, from the UDR device, an indication of a subscription to receive the data change notification based on the subscription request and a report based on the report indication

SYSTEMS AND METHODS FOR OPTIMIZED PROPAGATION OF DATA CHANGE NOTIFICATIONS

BACKGROUND

A unified data repository (UDR) device may support one or more network devices or network functions (e.g., a policy control function (PCF), a unified data management (UDM) device, and/or a network exposure function (NEF)). As an example, the one or more network devices may communicate (e.g., via an interface) with the UDR device to store and/or retrieve subscription data, policy data, structured data for exposure, and/or application data, among other examples. As another example, the one or more network devices may subscribe to receive data change notifications from the UDR device (e.g., based on the UDR device determining that data associated with a subscription is updated).

BRIEF DESCRIPTION OF THE DRAWINGS

FIG. 5 is a flowchart of an example process associated with optimized propagation of data change notifications.

FIG. 6 is a flowchart of an example process associated with optimized propagation of data change notifications.

DETAILED DESCRIPTION OF EXAMPLE EMBODIMENTS

Figure 1A:
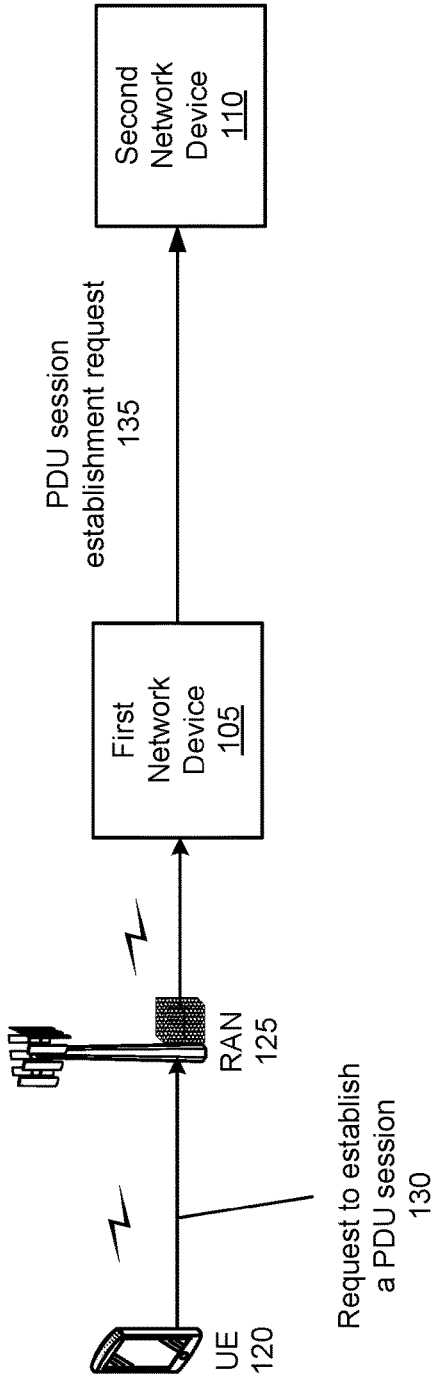
FIGS. 1A-1C are diagrams of an example associated with optimized propagation of data change notifications.

The following detailed description of example implementations refers to the accompanying drawings. The same reference numbers in different drawings may identify the same or similar elements.

The following detailed description of example implementations refers to the accompanying drawings. The same reference numbers in different drawings may identify the same or similar elements.

A unified data repository (UDR) device may store data (e.g., subscription data, policy data, structured data for exposure, and/or application data) associated with user equipments (UEs), such as UEs associated with subscribers of a mobile network operator (MNO). For example, the UDR device may store one or more data sets (e.g., one or more subscription data sets and/or one or more policy data sets, among other examples) which include data (e.g., subscription data and/or policy data, among other examples). As an example, the UDR device may be associated with a session management function (SMF) selection subscription data set which includes SMF selection subscription data, an access and mobility (AM) subscription data set which includes AM subscription data, and/or a short message service (SMS) subscription data set which includes SMS subscription data set (e.g., associated with an individual UE). As another example, the UDR device may be associated with an AM policy data set (e.g., which includes AM policy data), an SM policy data set (e.g., which includes SM policy data), and/or a UE policy data set (e.g., which includes UE policy data), among other examples.

The UDR device may use uniform resource identifiers (URIs) to address the data sets (e.g., subscription data set and/or policy data sets) based on a resource URI structure associated with the UDR device (e.g., associated with an application programming interface (API) of the UDR device). A network device or a network function may use an interface (e.g., an Nudr interface, an N35 interface, and/or an N36 interface) to access a particular set of data stored by the UDR device (e.g., by using a Hypertext Transfer Protocol (HTTP) or another application layer protocol). The Nudr interface may be an interface defined (e.g., by a wireless communication standard, such as the 3rd Generation Partnership Project (3GPP)), for one or more network devices (e.g., a unified data management (UDM) device, a policy control function (PCF) device, and/or a network exposure function (NEF) device).

The N35 interface may be an interface defined (e.g., by the 3GPP) as a reference point between the UDM device and the UDR device (e.g., for communications and/or interactions between the UDM device and the UDR device). The N36 interface may be defined (e.g., by 3GPP) as a reference point between the PCF device and the UDR device (e.g., for communications and/or interactions between the PCF device and the UDR device). In other words, for example, the Nudr interface may serve as a direct interface between the UDM device and the UDR device, between the PCF device and the UDR device, and/or between the NEF device and the UDR device. The N35 interface may serve as a direct communication interface between the UDM device and the UDR device. The N36 interface may serve as a direct communication interface between the PCF device and the UDR device.

In some cases, a network device may obtain data (e.g., subscription data and/or policy data associated with a UE) from the UDR device and subscribe to receive data change notifications (e.g., associated with the data) from the UDR device. Based on identifying that data is to be obtained from the UDR device, the network device may communicate with the UDR device to obtain the data from the UDR device via a first request and may subscribe to receive the data change notifications from the UDR device via a second request. In other words, the network device may use two independent communications (e.g., communications transmitted at different times) to obtain the data from the UDR device and subscribe to receive data change notifications from the UDR device.

For example, to obtain the data from the UDR device, the network device may transmit, to the UDR device, a data retrieval request (e.g., via an HTTP GET communication) to retrieve data (e.g., associated with the UE) included in one or more data sets (e.g., data resources) of the UDR device. The data retrieval request may identify the individual UE (e.g., based on a subscription permanent identifier (SUPI) associated with the individual UE), a requested data type (e.g., a data type associated with the data to be retrieved), and/or query parameters (e.g., supported features and/or a public land mobile network (PLMN) identifier (plmn-id).

As an example, the UDM device may transmit, to the UDR device, a request to retrieve subscription data associated with an individual UE (e.g., the SMF selection subscription data, the AM subscription data, and/or the SMS subscription data associated with the individual UE, among other examples). As another example, the PCF device may transmit, to the UDR device, a request to retrieve policy data associated with an individual UE (e.g., the AM policy data, the SM policy data, and/or the UE policy data associated with the individual UE, among other examples).

For example, to subscribe to receive the data change notifications from the UDR device, the network device may transmit, to the UDR device, a subscription request (e.g., via an HTTP POST communication) to subscribe to receive the data change notifications (e.g., associated with updates to the data associated with the UE that is included in the one or more data sets of the UDR device) from the UDR device. The subscription request may identify the individual UE (e.g., based on a SUPI associated with the individual UE) and/or a monitored data set (e.g., a data set that is monitored by the UDR device for data changes).

As an example, to subscribe to receive data change notifications associated with subscription data, the UDM device may transmit a request to subscribe to receive data change notifications associated with data changes to the SMF selection subscription data included in the SMF selection subscription data set, the AM subscription data included in the AM subscription data set, and/or the SMS subscription data included in the SMS subscription data set. As another example, to subscribe to receive data change notifications associated with the policy data, the PCF device may transmit a subscription request to subscribe to receive data change notifications associated with data changes to the AM policy data included in the AM policy data set, the SM policy data included in the SM policy data set, and/or the UE policy data included in the UE policy data set.

Therefore, network devices (e.g., the UDM device, the PCF device, and/or the UDR device) consume resources (e.g., computing resources, network resources, processing resources, and/or memory resources, among other examples) associated with performing operations to obtain data from the UDR device via a first request and subscribe to receive the data change notifications from the UDR device via a second request. Additionally, network performance may be negatively impacted (e.g., network resources may be consumed, and latency may be introduced when the network devices perform operations associated with obtaining data from the UDR device and subscribing to receive data change notifications from the UDR device via two requests) because the network devices may perform a large number of data operations based on two independent requests (e.g., requests that are transmitted at different times).

For example, if the network device (e.g., a UDM device and/or a PCF device) obtains data from the UDR device and subscribes to receive data change notifications from the UDR device for a large number of UEs, then the network device and the UDR device perform a large number of operations based on two requests for each UE of the large number of UEs, which increases network transactions per second (TPS). Furthermore, if the two requests are associated with a session setup procedure and/or a registration procedure, then the increased latency (e.g., associated with performing operations based on two requests) may result in an increased likelihood of a session setup timeout or a registration timeout, which may result in a fallback to a less desirable technology (e.g., a technology associated with reduced transfer speeds, reduced data rates, reduced throughput, and/or reduced quality of service (QOS) for the UE).

Additionally, because the network device obtains data from the UDR device and subscribes to receive data change notifications from the UDR device based on two requests (e.g., that are transmitted at different times), there is a risk that updated data may not be propagated to the network device. For example, if data associated with a UE is updated after the network device retrieves the data from the UDR device, but before the network device establishes a subscription to receive data change notifications from the UDR device, then the updated data will not be propagated to the network device (e.g., because the subscription to receive the data change notifications from the UDR device has not been established).

As an example, if the network device transmits, to the UDR device, a data retrieval request to retrieve data included in one or more data sets of the UDR device at a first time, and if the network device transmits the subscription request to subscribe to receive data change notifications (e.g., associated with the data) from the UDR device at a second time (e.g., that is later than the first time), then data updates to the data included in the one or more data sets of UDR device that occur at a time that is between the first time and the second time will not be propagated to the network device (e.g., because the subscription to receive the data change notifications from the UDR device has not been established).

As a result, the network device may provision the UE with stale data (e.g., data that is not current), which may negatively affect network performance and/or may consume resources. For example, if the network device provisions the UE with stale data that indicates an upgraded QoS level (e.g., low latency) associated with the UE rather than current data that indicates a standard QoS level (e.g., standard latency) associated with the UE, then resources may be consumed that could have otherwise been conserved and/or used elsewhere (e.g., because more resources are used to provide the upgraded QoS level than the standard QoS level).

Some implementations described herein enable optimized propagation of data change notifications (e.g., associated with a subscription data set and/or a policy data set of the UDR device). For example, a network device (e.g., a UDM device and/or a PCF device) may obtain data from the UDR device that is associated with a first one or more data sets (e.g., in response to a request, transmitted by another network device (e.g., an access and mobility management function (AMF) device), that is associated with a session setup procedure and/or a registration procedure) and/or subscribe to receive data change notifications, from the UDR device, that are associated with a second one or more data sets based on a single communication (e.g., a subscription request with a report indication, as described in more detail elsewhere herein). The first one or more data sets and the second one or more data sets may be the same one or more data sets or may be different data sets.

In some implementations, the network device may transit, and the UDR device may obtain or receive, a subscription request to subscribe to receive data change notifications from the UDR device. As an example, the network device may transmit the subscription request to the UDR device via an interface between the network device and the UDR device (e.g., the Nudr interface, the N35 interface, and/or the N36 interface). For example, a UDM device may transmit, and the UDR device may obtain or receive, the subscription request via a direct communication interface between the UDM device and the UDR device (e.g., the Nudr interface and/or the N35 interface).

As another example, a PCF device may transmit, and the UDR device may obtain or receive, the subscription request via a direct communication interface between the PCF device and the UDR device (e.g., the Nudr interface and/or the N36 interface). In this way, the UDM device and/or the PCF device may obtain data for the UDR device and/or subscribe to receive data change notifications from the UDR device by using a single communication, as described in more detail elsewhere herein. This improves network performance and conserves resources (e.g., computing resources, network resources, processing resources, and/or memory resources, among other examples) that would have otherwise been used obtaining data from the UDR device and subscribing to receive data change notifications from the UDR device using separate and/or multiple communications.

In some implementations, the subscription request may include a monitoring indication that identifies one or more monitored data sets that include data that is associated with a UE. A monitored data set may be a data set that is monitored by the UDR device for data changes (e.g., associated with the data that is associated with the UE). As an example, the one or more monitored data sets may be one or more subscription data sets (e.g., that include SMF selection subscription data, AM subscription data, and/or SMS subscription data, among other examples) and/or one or more policy data sets (e.g., that include AM policy data, SM policy data, and/or UE policy data, among other examples) of the UDR device. Thus, for example, if the subscription request identifies the one or more monitored data sets as the subscription data set and/or the policy data set of the UDR device, then the UDR device may monitor the subscription data set and/or the policy data set for changes to the data included in the subscription data set and/or the data included in the policy data set.

In some implementations, the subscription request may include a report indication (e.g., an immediate report indication or an immediate report request) that identifies one or more attribute data sets associated with the UE. An attribute data set may be a data set of the UDR device that includes data associated with a UE. As an example, the one or more attribute data sets may be a provisioned data set (e.g., that includes provisioned data associated with the UE), a subscription data (e.g., that includes subscription data associated with the UE, and/or a policy data set (e.g., that includes policy data associated with the UE).

In some implementations, the report indication may indicate a request (e.g., an immediate report request) to receive, from the UDR device, a report associated with the attribute data set. For example, if the report indication identifies the provisioned data, the subscription data, and/or the policy data associated with the UE as the one or more attribute data sets, then the UDR device may generate a report that includes the provisioned data (e.g., included in the provisioned data set), the subscription data (e.g., included in the subscription data set), and/or the policy data (e.g., included in the policy data set) associated with the UE. As an example, the UDR device may transmit, to the network device, the report that includes the provisioned data, the subscription data, and/or the policy data based on the report indication (e.g., in the subscription request).

Thus, some implementations described herein enable the network device to use a single communication (e.g., communicated via an interface between the network device and the UDR device) to subscribe to receive data change notifications from the UDR device that are associated with a first one or more data sets (e.g., by identifying the one or more monitored data sets via the subscription request) and to obtain data from the UDR device that are associated with a second one or more data sets (e.g., by identifying the one or more attribute data sets via the report indication). As an example, the first one or more data sets and the second one or more data sets may be a same one or more data sets. As another example, the first one or more data sets and the second one or more data sets may be different data sets.

In this way, network device (e.g., a UDM device and/or a PCF device) may obtain data from the UDR device that are associated with a first one or more data sets and/or subscribe to receive data change notifications, from the UDR device, that are associated with a second one or more data sets via less communications (e.g., a single communication) relative to obtaining data from the UDR device and subscribing to receive data change notifications from the UDR device via two or more requests. This improves network performance and conserves resources (e.g., computing resources, network resources, processing resources, and/or memory resources, among other examples) associated with obtaining data from the UDR device and subscribing to receive data change notifications from the UDR device (e.g., because less communications are used and because the risk that updated data may not be propagated to the network device based on an update that occurs between two independent communications is mitigated). For example, a UDM device and/or a PCF device is enabled to obtain data from the UDR device and to subscribe to receive data change notifications from the UDR device in a single communication, thereby mitigating a risk that updates that may occur to the data in a time between multiple communications (e.g., that would have otherwise been used to obtain the data and to subscribe to data change notifications) are not propagated to or provided to the UDM device and/or a PCF device.

Figure 1B:
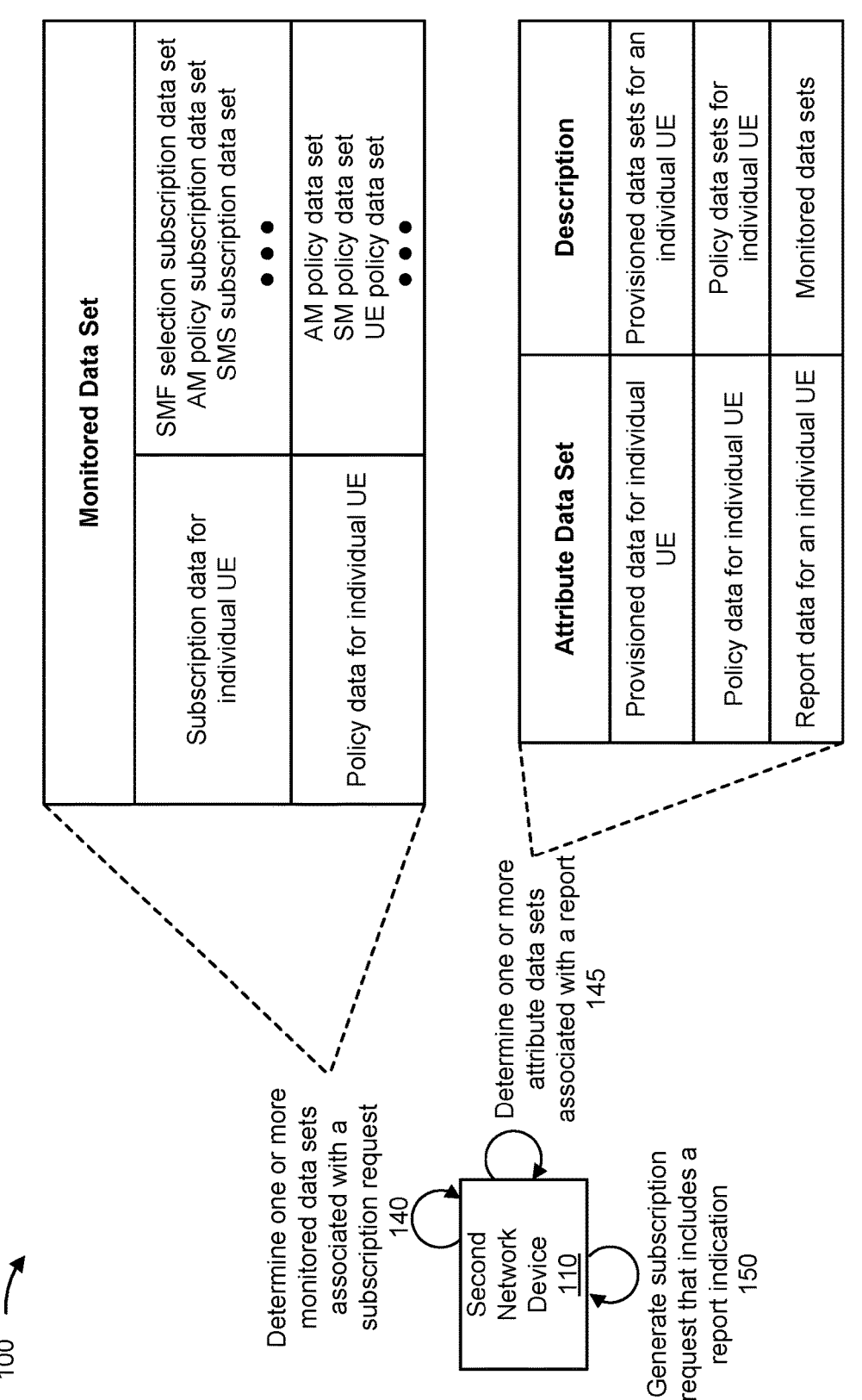
Figure 1C:
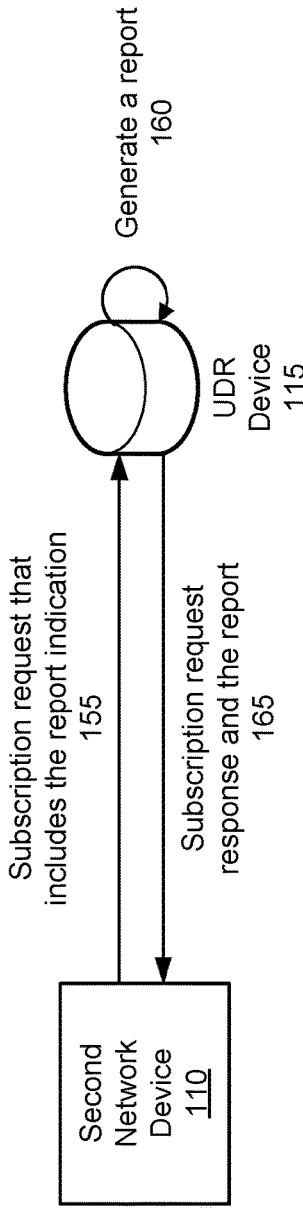

FIGS. 1A-1C are diagrams of an example 100 associated with optimized propagation of data change notifications. As shown in FIGS. 1A-1C, example 100 includes a first network device 105, a second network device 110, a UDR device 115, a UE 120, and a radio access network (RAN) 125.

As shown in FIG. 1A, and by reference number 130, the UE 120 may transmit, for the first network device 105 (e.g., an AMF device), a request to establish a packet data unit (PDU) session. For example, the UE 120 may transmit the request to establish the PDU session to the RAN 125, and the RAN 125 may transmit the request to establish the PDU session to the first network device 105. As an example, the UE 120 may transmit the request to establish the PDU session to access a network (e.g., a wired network and/or a wireless network) via the RAN 125. Although the UE 120 has been described as transmitting the request to establish the PDU session in connection with reference number 130 of FIG. 1A, the UE 120 may transmit another type of request (e.g., a registration request, among other examples).

As shown by reference number 135, the first network device 105 may transmit, and the second network device 110 (e.g., a UDM device and/or a PCF device) may receive, a PDU session establishment request. For example, the first network device 105 may transmit the PDU session establishment request to the second network device 110 in response to receiving the request to establish the PDU session from the UE 120. As an example, the first network device 105 may transmit the PDU session establishment request to the second network device 110 to obtain AM policies (e.g., via communication with an AM-PCF), to obtain UE policies (e.g., via communication with a UE-PCF), and/or to obtain user profile and/or subscriber profile information (e.g., via communication with a UDM device and/or the UDR device 115). In other examples, the second network device 110 may perform operations described herein, such as in connection with FIGS. 1B, 1C, and 2, based on other triggers or reasons (e.g., other than obtaining the PDU session establishment request).

As shown in FIG. 1B, and by reference number 140, the second network device 110 may determine one or more monitored data sets associated with a subscription request. In some implementations, the second network device 110 may determine the one or more monitored data set based on determining to receive data change notifications associated with one or more data sets of the UDR device 115.

For example, if the second network device 110 determines to receive data change notifications associated with subscription data that is associated with an individual UE, then the second network device may determine the one or more monitored data sets to be one or more subscription data sets (e.g., shown as SMF selection subscription data set, AM subscription data set, and SMS subscription data set in FIG. 1B). As another example, if the second network device 110 determines to receive data change notifications associated with policy data that is associated with the UE 120 (e.g., a given UE), then the second network device may determine the one or more monitored data sets to be one or more policy data sets (e.g., shown as AM policy data set, SM policy data set, and UE policy data set in FIG. 1B).

As shown by reference number 145, the second network device 110 may determine one or more attribute data sets associated with a report. As used herein, an attribute data set may refer to a data set that is to be indicated in a report from the UDR device 115 (e.g., a report triggered via a subscription request communication, as described in more detail elsewhere herein). In some implementations, the second network device 110 may determine the one or more attribute data sets based on determining to obtain data (e.g., associated with an individual UE, such as the UE 120) included in one or more data sets of the UDR device 115. For example, if the second network device 110 determines to obtain provisioned data associated with the UE 120 or another UE, then the second network device 110 may determine the one or more attribute data sets to be one or more provisioned data sets (e.g., shown as provisioned data sets for an individual UE in FIG. 1B).

As an example, if the second network device 110 determines to obtain policy data associated with an individual UE, then the second network device 110 may determine the one or more attribute data sets to be one or more policy data sets (e.g., shown as policy data sets for individual UE in FIG. 1B). As another example, if the second network device 110 determines to obtain data associated with data included in the one or more monitored data sets (e.g., shown as report data for individual UE in FIG. 1B), then the second network device 110 may determine the one or more attribute data sets to be the one or more monitored data sets (e.g., shown as monitored data sets in FIG. 1B). In this way, the second network device 110 may selectively determine one or more data sets to be monitored by the UDR device 115 and/or one or more data sets to be obtained from the UDR device 115 (e.g., in a report). Although the one or more monitored data sets and/or the one or more attribute data sets have been described as being associated with an individual UE (e.g., the same individual UE), the one or more monitored data sets and/or the one or more attribute data sets may be associated with different UEs (e.g., as identified in the subscription request and/or the report indication).

As shown by reference number 150, the second network device 110 may generate a subscription request that includes a report indication. For example, the subscription request may be a request to receive data change notifications from the UDR device 115 (e.g., for the one or more monitored data sets). In some implementations the subscription request may include a monitoring indication and/or a report indication (e.g., to trigger the UDR device 115 to provide a report indicating the one or more attribute data sets). For example, the monitoring indication may identify one or more monitored data sets (e.g., based on determining the one or more monitored data sets) to be monitored by the UDR device 115 for data changes. Further, the report indication may identify one or more attribute data sets (e.g., based on determining the one or more attribute data sets). The report indication may indicate a request to receive, from the UDR device 115, a report associated with the attribute data set (e.g., a report that includes data associated with the one or more attribute data sets).

As shown in FIG. 1C, and by reference number 155, the second network device 110 may transmit, and the UDR device 115 may obtain or receive, the subscription request that includes the report indication. In some implementations, transmitting the subscription request to the UDR device 115 enables the second network device 110 to subscribe to receive data change notifications (e.g., associated with data changes to data included in the one or more monitored data sets) from the UDR device 115 and to obtain a report that includes data (e.g., associated with an individual UE) that is included in the one or more attribute data sets, as described in more detail elsewhere herein.

As shown by reference number 160, the UDR device 115 may generate a report. For example, the UDR device 115 may generate the report based on the report indication. As an example, if the report indication identifies the one or more provisioned data sets (e.g., associated with the individual UE identified in the subscription request) as the one or more attribute data sets, then the UDR device 115 may generate a report that includes provisioned data (e.g., associated with the individual UE) that is included in one or more provisioned data sets of the UDR device 115. As an example, if the report indication identifies the one or more policy data sets (e.g., associated with an individual UE identified in the subscription request) as the one or more attribute data sets, then the UDR device 115 may generate a report that includes policy data (e.g., associated with the individual UE) that is included in one or more policy data sets of the UDR device 115. As another example, if the report indication identifies the one or more monitored data sets (e.g., associated with an individual UE identified in the subscription request) as the one or more attribute data sets, then the UDR device 115 may generate a report that includes data (e.g., associated with the individual UE) that is included in the one or more monitored data sets of the UDR device 115.

As shown by reference number 165, the UDR device 115 may transmit, to the second network device 110, a subscription request response and the report (e.g., in a single communication). In some implementations, the subscription request response may include an indication of a subscription to receive the data change notifications from the UDR device 115 that confirms that the subscription is created. As an example, the report may include the data (e.g., generated by the UDR device 115) that is included in the one or more attribute data sets, as described in more detail elsewhere herein.

In this way, first network device (e.g., a UDM device and/or a PCF device) may obtain data from the UDR device that are associated with a first one or more data sets and/or subscribe to receive data change notifications, from the UDR device, that are associated with a second one or more data sets via less communications (e.g., a single communication) relative to obtaining data from the UDR device and subscribing to receive data change notifications from the UDR device via two requests. This improves network performance and conserves resources (e.g., computing resources, network resources, processing resources, and/or memory resources, among other examples) associated with obtaining data from the UDR device and subscribing to receive data change notifications from the UDR device (e.g., because less communications are used and because the risk that updated data may not be propagated to the network device based on an update that occurs between two independent communications is removed).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
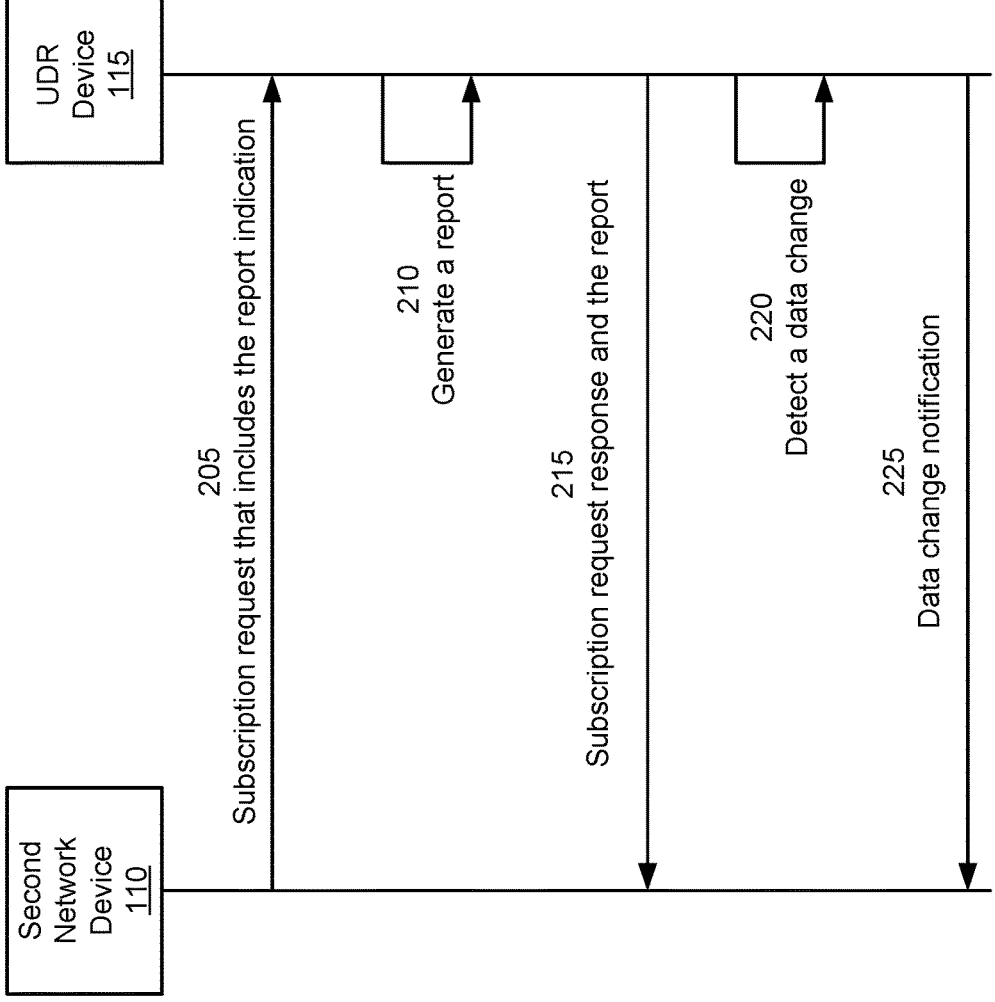
FIG. 2 is a diagram of an example associated with optimized propagation of data change notifications.

FIG. 2 is a diagram of an example 200 associated with optimized propagation of data change notifications. As shown in FIG. 2, example 200 includes the second network device 110 and the UDR device 115.

As shown in FIG. 2, and by reference number 205, the second network device 110 may transmit, and the UDR device 115 may receive or obtain, a subscription request that includes a report indication. For example, the second network device 110 may generate and/or provide the subscription request that includes the report indication in a similar (or the same) manner as described above in connection with FIGS. 1A-1C. In some implementations, the second network device 110 may transmit the subscription request that includes the report indication in response to receiving a request (e.g., from another network device, such as an AMF device) that is associated with a session setup procedure and/or a registration procedure, among other examples.

In other words, for example, the second network device 110 may transmit the subscription request to the UDR device 115 based on identifying that data is to be obtained (e.g., associated with a UE) from the UDR device 115 and/or based on identifying that the second network device 110 is to subscribe to receive data change notifications (e.g., associated with the UE) from the UDR device 115. As an example, the subscription request may include a monitoring indication and/or the report indication, as described in more detail elsewhere herein.

As shown by reference number 210, the UDR device 115 may generate a report. As an example, the UDR device 115 may generate a report in response to receiving the subscription request that includes the report indication. For example, the UDR device 115 may generate the report based on information associated with the report indication, as described in connection with reference number 160 of FIG. 1C and/or in more detail elsewhere herein.

As shown by reference number 215, the UDR device 115 may transmit, and the second network device 110 may receive or obtain, a subscription response and the report (e.g., in a single communication). For example, the UDR device 115 may create a subscription associated with providing data change notifications to the second network device 110 based on the subscription request (e.g., based on information associated with the monitoring indication). As an example, the UDR device 115 may generate the subscription request response to include both an indication of the subscription to receive the data change notifications from the UDR device 115 that confirms that the subscription is created and the report (e.g., generated by the UDR device 115) that includes the data (e.g., associated with a UE, such as the UE 120) that is included in the one or more attribute data sets, as described in connection with reference number 165 of FIG. 1C and/or in more detail elsewhere herein.

As shown by reference number 220, the UDR device 115 may detect a data change. In some implementations, the UDR device 115 may monitor the one or more monitored data sets for data changes. As an example, the UDR device 115 may detect a data change based on determining that data included in the one or more monitored data sets is changed (e.g., updated). For example, an MNO may update a subscriber profile associated with a UE to generate an updated subscriber profile. The MNO (e.g., a server device associated with the MNO) may provision the UDR device 115 with the updated subscriber profile, such as by replacing a stale subscriber profile (e.g., a subscribe profile that is not current) associated with the UE with the updated subscriber profile associated with the UE.

In some implementations, the updated profile may include updated data associated with one or more data sets of the UDR device 115 (e.g., one or more subscription data sets and/or policy data sets). As an example, if the updated data (e.g., of the subscriber profile) is associated with SMF selection subscription data, AM subscription data, SMS subscription data, AM policy data, SM policy data, and/or UE policy data, then the UDR device 115 may detect the data change based on monitoring the SMF selection subscription data set, the AM subscription data set, the SMS subscription data set, the AM policy data set, the SM policy data set, and/or the UE policy data set, of the UDR device 115, for data changes. For example, the UDR device 115 may detect a change or update in data associated with one or more monitored data sets indicated by the subscription request.

As shown by reference number 225, the UDR device 115 may transmit or provide, and the second network device 110 may receive or obtain, a data change notification. In some implementations, the UDR device 115 may determine, based on detecting the data change, updated data associated with the UE. For example, the UDR device 115 may compare data included in the stale subscriber profile to data included in the updated subscriber profile to determine whether the data included in the stale subscriber profile is different than the data included in the updated subscriber profile.

The UDR device 115 may determine the updated data based on determining that the data included in the stale subscriber profile is different than the data included in the updated subscriber profile (e.g., the updated data is the data included in the updated subscriber profile that is different than the data included in the stale subscriber profile). As an example, the updated data may be data that replaces data at least a portion of the data that is included in the stale subscriber profile. As another example, the updated data may be data that is in addition to data that is included in the stale subscriber profile. In some implementations, the data change notification (e.g., transmitted by the UDR device 115) may include an indication of the updated data associated with the UE (e.g., the updated data associated with the updated subscriber profile).

In this way, second network device 110 (e.g., a UDM device and/or a PCF device) may obtain data from the UDR device 115 that is associated with a first one or more data sets and/or subscribe to receive data change notifications, from the UDR device, that are associated with a second one or more data sets via less communications (e.g., via a single communication) relative to obtaining data from the UDR device 115 and subscribing to receive data change notifications from the UDR device 115 via two or more requests. This improves network performance and conserves resources (e.g., computing resources, network resources, processing resources, and/or memory resources, among other examples) associated with obtaining data from the UDR device 115 and subscribing to receive data change notifications from the UDR device 115 (e.g., because less communications are used and because the risk that updated data may not be propagated to the second network device 110 based on an update that occurs between two independent communications is removed).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
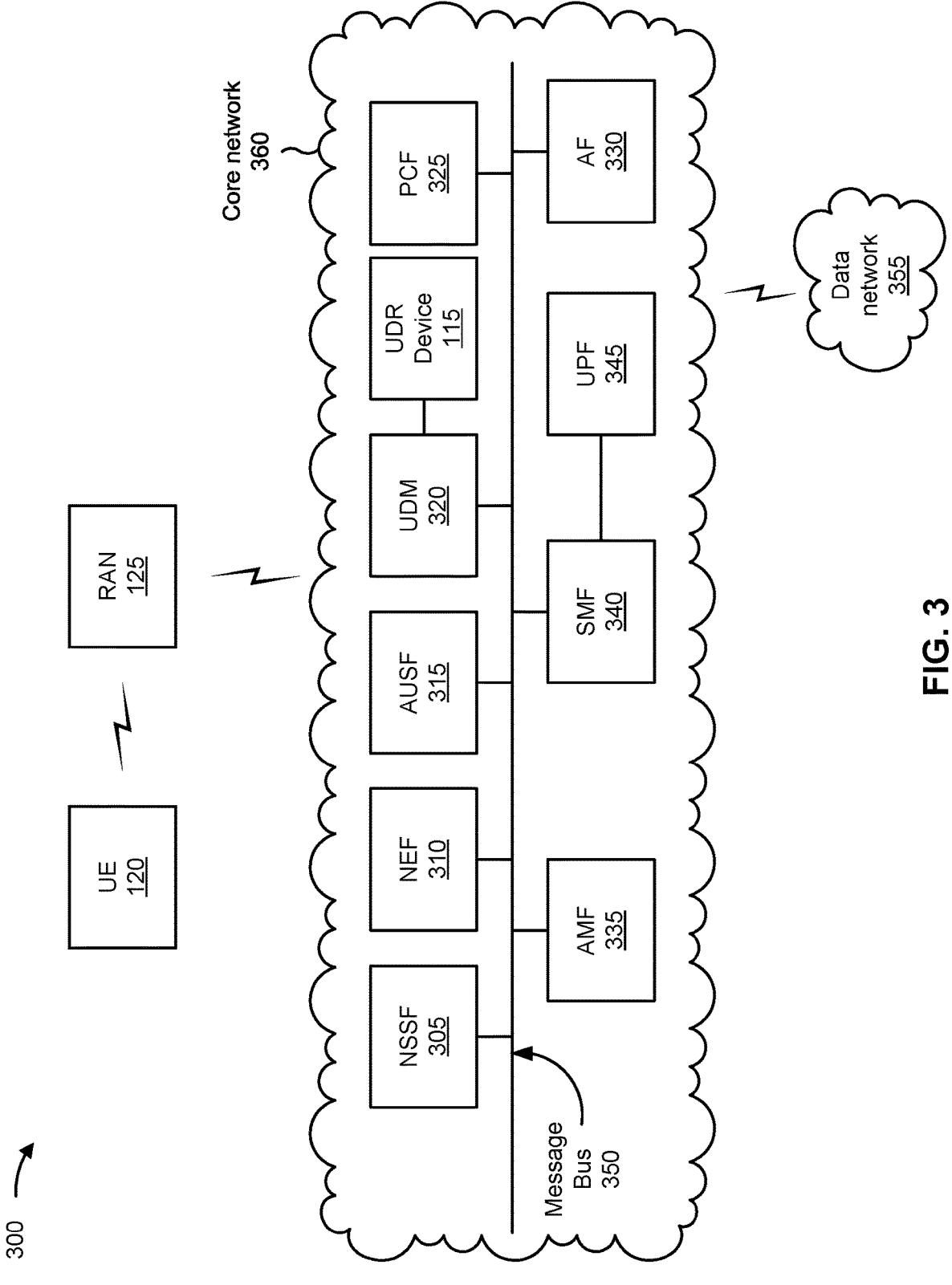
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 120, a RAN 125, a data network 355, and a core network 360. Devices and/or networks of example environment 300 may interconnect via wired connections, wireless connections, or a combination of wired and wireless connections.

UE 120 includes one or more devices capable of receiving, generating, storing, processing, and/or providing information, such as information described herein. For example, UE 120 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 125 may support, for example, a cellular radio access technology (RAT). RAN 125 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 120. RAN 125 may transfer traffic between UE 120 (e.g., using a cellular RAT), one or more base stations (e.g., using a wireless interface or a backhaul interface, such as a wired backhaul interface), and/or core network 360. RAN 125 may provide one or more cells that cover geographic areas.

In some implementations, RAN 125 may perform scheduling and/or resource management for UE 120 covered by RAN 125 (e.g., UE 120 covered by a cell provided by RAN 125). In some implementations, RAN 125 may be controlled or coordinated by a network controller, which may perform load balancing, network-level configuration, and/or other operations. The network controller may communicate with RAN 125 via a wireless or wireline backhaul. In some implementations, RAN 125 may include a network controller, a self-organizing network (SON) module or component, or a similar module or component. In other words, RAN 125 may perform network control, scheduling, and/or network management functions (e.g., for uplink, downlink, and/or sidelink communications of UE 120 covered by RAN 125).

In some implementations, core network 360 may include an example functional architecture in which systems and/or methods described herein may be implemented. For example, core network 360 may include an example architecture of a fifth generation (5G) next generation (NG) core network included in a 5G wireless telecommunications system. While the example architecture of core network 360 shown in FIG. 3 may be an example of a service-based architecture, in some implementations, core network 360 may be implemented as a reference-point architecture and/or a 4G core network, among other examples.

As shown in FIG. 3, core network 360 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345. For example, the first network device 105 and/or the second network device 110 may be the NSSF 305, the NEF 310, the AUSF 315, the UDM component 320, the PCF 325, the AF 330, the AMF 335, the SMF 340, and/or the UPF 345.

As another example, the first network device 105 may be the AMF 335 and/or the second network device 110 may be the UDM 320 and/or the PCF 325. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 305 includes one or more devices that select network slice instances for UE 120. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating UE 120 in the wireless telecommunications system.

UDM 320 includes one or more devices that store user data and profiles in the wireless telecommunications system. UDM 320 may be used for fixed access and/or mobile access in core network 360. The user data and profiles may be stored in the UDR device 115, which includes a data repository for storing the user data and profiles.

PCF 325 includes one or more devices that provide a policy framework that incorporates network slicing, roaming, packet processing, and/or mobility management, among other examples.

AF 330 includes one or more devices that support application influence on traffic routing, access to NEF 310, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intraRAT and/or interRAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
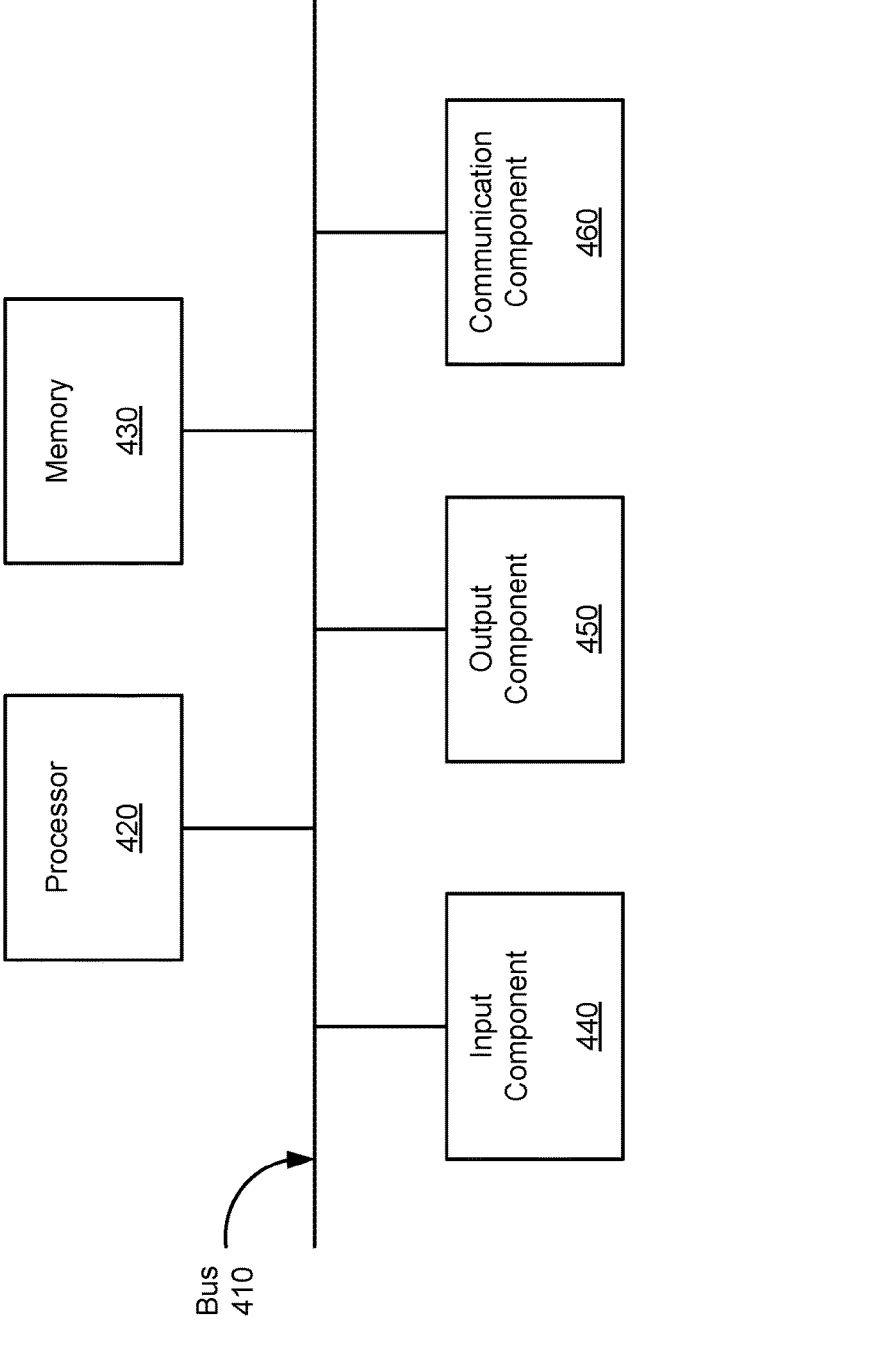
FIG. 4 is a diagram of example components of a device associated with optimized propagation of data change notifications.

FIG. 4 is a diagram of example components of a device 400 associated with optimized propagation of data change notifications. The device 400 may correspond to the first network device 105, the second network device 110, and/or the UDR device 115. In some implementations, the first network device 105, the second network device 110, and/or the UDR device 115 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with optimized propagation of data change notifications. In some implementations, one or more process blocks of FIG. 5 may be performed by a UDR device (e.g., UDR device 115). In some implementations, one or more process blocks of FIG. 5 may be performed by another device or a group of devices separate from or including the UDR device, such as a first network device (e.g., first network device 105) and/or a second network device (e.g., second network device 110). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, from a UDM device or a PCF device, a subscription request to subscribe to receive a data change notification from the UDR device (block 510). For example, the UDR device may receive, from the UDM device or the PCF device, a subscription request to subscribe to receive a data change notification from the UDR device. As an example, the subscription request may include a monitoring indication and a report indication. The monitoring indication may identify a monitored data set associated with a UE. The report indication may identify an attribute data set associated with the UE and may indicate a request to receive, from the UDR device, a report associated with the attribute data set, as described above.

For example, the monitored data set may be associated with at least one of subscription data associated with a UE and/or policy data associated with the UE. As an example, the monitored data set and the attribute data may be a same data set. Alternatively, the monitored data set and the attribute data may be different data sets. In some implementations, the attribute data set may be associated with at least one of provisioning data associated with the UE, data associated with the UE, and/or policy data associated with the UE.

As further shown in FIG. 5, process 500 may include transmitting, to at least one of the UDM device or the PCF device, an indication of a subscription to receive the data change notification based on the subscription request and the report based on the report indication (block 520). For example, the UDR device may transmit, to at least one of the UDM device or the PCF device, an indication of a subscription to receive the data change notification based on the subscription request and the report based on the report indication, as described above.

In some implementations, process 500 includes detecting, by the UDR device, a data change associated with the monitored data set, determining, based on detecting the data change, updated data associated with the UE, and transmitting, by the UDR device and to at least one of the UDM device or the PCF device, an indication of the data change notification based on the subscription. In some implementations, the data change notification includes an indication of the updated data associated with the UE. In some examples, a first interface between the UDM device and the UDR device and a second interface between the PCF device and the UDR device are direct interfaces.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with optimized propagation of data change notifications. In some implementations, one or more process blocks of FIG. 6 may be performed by a network device (e.g., the second network device 110, the UDM 320, and/or the PCF 325). In some implementations, one or more process blocks of FIG. 6 may be performed by another device or a group of devices separate from or including the network device, such as a first network device (e.g., first network device 105) and/or a UDR device (e.g., UDR device 115). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include transmitting, via an interface between the network device (e.g., a UDM device and/or a PCF device) and the UDR device, a subscription request to subscribe to receive a data change notification from the UDR device (block 610). For example, the network device may transmit, via an interface between the network device and the UDR device, a subscription request to subscribe to receive a data change notification from the UDR device, as described above. In some implementations, the subscription request may include a monitoring indication that identifies a monitored data set associated with a UE and a report indication. The report indication may identify an attribute data set associated with the UE and may indicate a request to receive, from the UDR device, a report associated with the attribute data set, as described above.

In some implementations, the network device may be at least one of the UDM device and/or the PCF device that transmits the subscription request to the UDR device via a direct interface. As an example, the monitored data set may be associated with at least one of subscription data associated with a UE and/or policy data associated with the UE. For example, the monitored data set and the attribute data set may be a same data set. As another example, the monitored data set and the attribute data set may be different data sets. In some implementations, the attribute data set may be associated with at least one of provisioning data associated with a UE, subscription data associated with the UE, and/or policy data associated with the UE.

As further shown in FIG. 6, process 600 may include receiving, from the UDR device, an indication of a subscription to receive the data change notification based on the subscription request and the report based on the report indication (block 620). For example, the network device may receive, from the UDR device, an indication of a subscription to receive the data change notification based on the subscription request and the report based on the report indication, as described above.

In some implementations, process 600 includes receiving, from the UDR device and based on the subscription, the data change notification, wherein the data change notification includes an indication of updated data associated with the UE.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a unified data repository (UDR) device and from a unified data management (UDM) device or a policy control function (PCF) device, a subscription request to subscribe to receive a data change notification from the UDR device,
      wherein the subscription request includes:
         a monitoring indication that identifies a monitored data set associated with a user equipment (UE), and
         a report indication that:
            identifies an attribute data set associated with the UE, and
            indicates a request to receive a report associated with the attribute data set; and
   transmitting, by the UDR device to at least one of the UDM device or the PCF device and based on the subscription request, the report and an indication of a subscription to receive the data change notification,
      wherein the report is based on the report indication.

2. The method of claim 1, wherein the monitored data set is associated with at least one of:
   subscription data associated with the UE, or
   policy data associated with the UE.

3. The method of claim 1, wherein the monitored data set and the attribute data set are a same data set.

4. The method of claim 1, wherein the monitored data set and the attribute data set are different data sets.

5. The method of claim 1, wherein the attribute data set is associated with at least one of:
   provisioned data associated with the UE,
   subscription data associated with the UE, or
   policy data associated with the UE.

6. The method of claim 1, further comprising:
   detecting, by the UDR device, a data change associated with the monitored data set;
   determining, based on detecting the data change, updated data associated with the UE; and
   transmitting, by the UDR device and to at least one of the UDM device or the PCF device, an indication of the data change notification based on the subscription,
      wherein the data change notification includes an indication of the updated data associated with the UE.

7. The method of claim 1, wherein a first interface between the UDM device and the UDR device and a second interface between the PCF device and the UDR device are direct interfaces.

8. A network device, comprising:
   one or more processors configured to:
      transmit, via an interface between the network device and a unified data repository (UDR) device, a subscription request to subscribe to receive a data change notification from the UDR device,
         wherein the subscription request includes:
            a monitoring indication that identifies a monitored data set associated with a user equipment (UE), and
            a report indication that:
               identifies an attribute data set associated with the UE, and
               indicates a request to receive a report associated with the attribute data set; and receive, from the UDR device and based on the subscription request, the report and an indication of a subscription to receive the data change notification, wherein the report is based on the report indication.

9. The network device of claim 8, wherein the network device is at least one of a unified data management (UDM) device or a policy control function (PCF) device, and wherein the one or more processors, to transmit the subscription request to subscribe to receive the data change notification from the UDR device, are configured to:

transmit the subscription request to the UDR device via a direct interface.

10. The network device of claim 8, wherein the monitored data set is associated with at least one of:

subscription data associated with the UE, or policy data associated with the UE.

11. The network device of claim 8, wherein the monitored data set and the attribute data set are a same data set.

12. The network device of claim 8, wherein the monitored data set and the attribute data set are different data sets.

13. The network device of claim 8, wherein the attribute data set is associated with at least one of:

provisioned data associated with the UE, subscription data associated with the UE, or policy data associated with the UE.

14. The network device of claim 8, wherein the one or more processors are further configured to:

receive, from the UDR device and based on the subscription, the data change notification, wherein the data change notification includes an indication of updated data associated with the UE.

15. A non-transitory computer-readable medium storing a set of instructions, the set of instructions comprising:

one or more instructions that, when executed by one or more processors of a network device, cause the network device to:

transmit a subscription request to subscribe to receive a data change notification from a unified data repository (UDR) device, wherein the subscription request includes an immediate report request; and receive, from the UDR device and based on the subscription request, a communication that includes a report and an indication of a subscription to receive the data change notification based on the subscription request, wherein the report is based on the immediate report request.

16. The non-transitory computer-readable medium of claim 15, wherein the network device is a unified data management (UDM) device, and wherein the one or more instructions, that cause the network device to transmit the subscription request to subscribe to receive the data change notification from the UDR device, cause the network device to:

transmit the subscription request to the UDR device via a direct interface between the UDM device and the UDR device.

17. The non-transitory computer-readable medium of claim 15, wherein the network device is a policy control function (PCF) device, and wherein the one or more instructions, that cause the network device to transmit the subscription request to subscribe to receive the data change notification from the UDR device, cause the network device to:

transmit the subscription request to the UDR device via a direct interface between the PCF device and the UDR device.

18. The non-transitory computer-readable medium of claim 15, wherein the data change notification is associated with at least one of:

subscription data associated with a user equipment (UE), or policy data associated with the UE.

19. The non-transitory computer-readable medium of claim 15, wherein the report includes attribute data associated with a user equipment (UE), the attribute data including at least one of:

provisioned data associated with the UE, subscription data associated with the UE, or policy data associated with the UE.

20. The non-transitory computer-readable medium of claim 15, wherein the one or more instructions, when executed by the one or more processors, further cause the network device to:

receive, from the UDR device and based on the subscription, the data change notification, wherein the data change notification includes an indication of updated data associated with a user equipment (UE).

\* \* \* \* \*